(12) United States Patent
Salour et al.

(10) Patent No.: US 9,841,501 B1
(45) Date of Patent: Dec. 12, 2017

(54) USE OF BLINK COUNTS TO LOCATE MOVABLE TAGGED ASSETS

(71) Applicant: The Boeing Company, Chicago, IL (US)

(72) Inventors: Ali Salour, St. Louis, MO (US); Michael D. McInnis, Port Orchard, WA (US); Douglas D. Trimble, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 440 days.

(21) Appl. No.: 13/663,458

(22) Filed: Oct. 29, 2012

(51) Int. Cl.
*G08B 5/22* (2006.01)
*G01S 13/87* (2006.01)

(52) U.S. Cl.
CPC .................... *G01S 13/878* (2013.01)

(58) Field of Classification Search
CPC .... G01S 3/02; G01S 1/24; H04W 4/00; G06F 19/06; G06G 7/78; G08B 13/14; G08B 3/10; B60C 23/00; H04Q 5/22; B64C 19/00; B64C 3/00; B01C 21/00
USPC .................. 340/572.1, 571, 10.6, 10.2, 447; 701/117, 408; 342/464, 451, 457, 463; 700/91; 705/1
See application file for complete search history.

(56) References Cited

U.S. PATENT DOCUMENTS

| | | | |
|---|---|---|---|
| 6,040,774 A * | 3/2000 | Schepps | 340/572.1 |
| 6,177,886 B1 * | 1/2001 | Billington et al. | 340/934 |
| 6,219,613 B1 * | 4/2001 | Terrier et al. | 701/408 |
| 6,456,239 B1 * | 9/2002 | Werb et al. | 342/463 |
| 7,132,939 B2 * | 11/2006 | Tyndall et al. | 340/447 |
| 7,528,721 B2 * | 5/2009 | Levin et al. | 340/572.1 |
| 7,667,572 B2 * | 2/2010 | Husak et al. | 340/10.1 |
| 7,898,414 B2 * | 3/2011 | Spano | 340/571 |
| 7,899,006 B2 | 3/2011 | Boyd | |
| 7,916,023 B2 | 3/2011 | Rado | |
| 7,916,026 B2 | 3/2011 | Johnson et al. | |
| RE42,285 E * | 4/2011 | Anderson et al. | 342/457 |
| 7,979,197 B2 * | 7/2011 | Finn et al. | 701/117 |
| 8,149,169 B1 * | 4/2012 | Ameti et al. | 342/464 |
| 8,305,194 B2 * | 11/2012 | Noel et al. | 340/10.2 |
| 2006/0006986 A1 * | 1/2006 | Gravelle et al. | 340/10.3 |
| 2006/0015357 A1 * | 1/2006 | Cagan | 705/1 |
| 2006/0187043 A1 * | 8/2006 | Allen | G06Q 10/087 340/572.1 |
| 2007/0024437 A1 * | 2/2007 | Nelson | G08B 13/14 340/539.1 |
| 2007/0222595 A1 * | 9/2007 | Motteram et al. | 340/572.1 |
| 2007/0229265 A1 * | 10/2007 | Takeuchi | G06K 7/0008 340/572.1 |
| 2007/0257795 A1 * | 11/2007 | Overhultz | G01S 5/0252 340/572.1 |
| 2008/0151313 A1 * | 6/2008 | Ishimaru | H04N 1/00342 358/400 |

(Continued)

OTHER PUBLICATIONS

Zebra Dart UWB Technology Data Sheet, http://www.zebra.com/content/dam/zebra/product-information/en-us/brochures-datasheets/location-solutions/dart-uwb-tech-ds-en-us.pdf (May 2012).

*Primary Examiner* — Nabil Syed (74) *Attorney, Agent, or Firm* — Miller, Matthias & Hull LLP (57) ABSTRACT

A method of locating a tagged movable asset comprises determining blink counts for receivers in a plurality of zones, and selecting one of the zones according to a comparison of the blink counts.

22 Claims, 8 Drawing Sheets

(56) References Cited

U.S. PATENT DOCUMENTS

| | | | |
|---|---|---|---|
| 2009/0303004 A1* | 12/2009 | Tuttle | 340/10.1 |
| 2010/0030350 A1* | 2/2010 | House et al. | 700/91 |
| 2010/0156599 A1* | 6/2010 | Ainsbury | G01S 5/0278 340/10.1 |
| 2010/0201488 A1* | 8/2010 | Stern et al. | 340/10.1 |
| 2011/0148589 A1 | 6/2011 | Johnson et al. | |
| 2011/0170430 A1* | 7/2011 | Yang | G01D 21/00 370/252 |
| 2011/0298607 A1* | 12/2011 | Priyantha | G06Q 10/087 340/505 |
| 2012/0013509 A1* | 1/2012 | Wisherd et al. | 342/451 |
| 2012/0169478 A1* | 7/2012 | Spindel et al. | 340/10.6 |

\* cited by examiner

USE OF BLINK COUNTS TO LOCATE MOVABLE TAGGED ASSETS

BACKGROUND

Active tag asset management systems may use short-range readers and embedded active tags to locate equipment, inventory, people and other assets in real time. Active tag locations may be determined from measurements of receive signal strength indication (RSSI), signal angle-of-arrival (AoA), or signal time difference of arrival (TDOA) at and between multiple readers.

For certain readers, however, these signal measurements are not available. It would be desirable to locate active tags without having to measure RSSI, AoA or TDOA.

SUMMARY

According to an embodiment herein, a method of locating a tagged movable asset comprises determining blink counts for receivers in a plurality of zones, and selecting one of the zones according to a comparison of the blink counts.

According to another embodiment herein, a system can locate an active tag within one of a plurality of spatial zones. Each spatial zone includes a reader. The system comprises a processor programmed to compare received blink count indications between the readers, and select the one zone according to the comparison.

According to another embodiment herein, a system for use with a plurality of spatial stalls comprises a plurality of tagged assets located in at least one of the stalls. Each asset is tagged with an active tag, which periodically transmits a wireless signal including an identifier. The system further comprises a plurality of sets of readers. Each set is located within one of the stalls. The system further comprises a processing system for determining locations of the assets with respect to the sets of readers, including aggregating received blink count indications for each set of readers, comparing the aggregated receive blink count indications, and selecting one of the sets and, therefore, one of the stalls according to the comparison.

These features and functions may be achieved independently in various embodiments or may be combined in other embodiments. Further details of the embodiments can be seen with reference to the following description and drawings.

DETAILED DESCRIPTION

Figure 1:
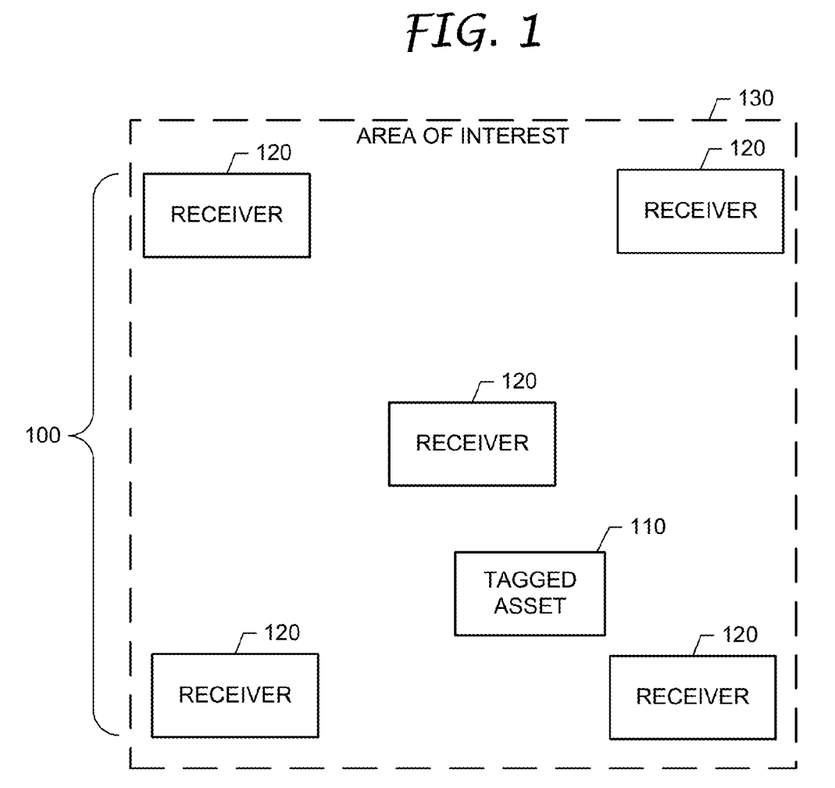
FIG. 1 is an illustration of a movable tagged asset and a plurality of receivers.

Reference is made to FIG. 1, which illustrates a system 100 for monitoring the location of a tagged asset 110 within an area 130 of interest. The tagged asset 110 is movable within the area 130. Examples of the tagged asset 110 include, without limitation, a person, a piece of equipment, and an item in inventory. Examples of the area 130 include, without limitation, a factory, warehouse, and field.

The asset 110 is tagged with a device that emits a wireless signal in periodic bursts, which bursts are referred to as "blinks." The asset 110 may be tagged with an active tag (e.g., an RFID device). In some embodiments, transmit range and frequency of the wireless signal may be fixed.

The system 100 also includes a plurality of receivers 120 distributed within the area 130. Any receivers 120 within range of the tagged asset 110 will receive the wireless signal. In some embodiments, receiver range sensitivity may be adjusted up or down to increase or reduce the receiving range.

The wireless signal may be a radiowave signal or a lightwave signal. In some embodiments, the asset 110 may be tagged with an active RFID device. In other embodiments, the asset 110 may be tagged with a short range wireless optical device such as an LED. The LED may transmit an optical signal in the visible or infrared range, and the receivers 120 may include detectors for receiving the optical signal.

A count is kept of received blinks. This count is referred to as a "blink count." A blink count that is kept over an interval (e.g., a number of seconds) and reset at the beginning of the interval is referred to as a "received blink count indication" (RBCI).

Based on tests conducted by the applicants, the applicants have discovered that the received blink count indication is proportional to length of the signal path between the tagged asset 110 and a receiver 120. Thus, if a first receiver 120 receives a higher blink count than an $N^{th}$ receiver 120, the tagged asset 110 is likely to be closer to the first receiver 120 than the $N^{th}$ receiver 120.

By arranging the receivers 120 in a pattern over the area 130, the location of the tagged asset 110 within the area 130 may be narrowed. For example, if the receivers 120 are arranged in a grid pattern, the location of the tagged asset 110 may be narrowed to a grid element.

The use of RBCI is advantageous in a dynamic environment in which the asset 110 moves over the area 130. By updating the blink counts over intervals, the tagged asset 110 can be tracked as it moves within the area 130. The receivers 120 can also detect whether the tagged asset 110 is inoperative or leaves the area 130. Movement of the asset 110 is advantageous in that it also help is rule out receive blink count indications from more distant receivers. Thus, the movement helps to isolate the location of the tagged asset 110.

In some embodiments, the interval may be dynamically adjusted to account for the frequency or speed at which the asset 110 is moved within the area 130. For example, a shorter interval may help determine quickly whether a tagged asset 110 has moved from one receiver 120 to another receiver 120 as the tagged asset 110 enters, leaves, or moves about the area 130. The interval may also be varied when movement of the asset 110 is detected. For example, the interval may be decreased upon movement of the asset 110. Movement of the asset 110 may be detected, for example, by a sensor such as an accelerometer or mercury switch embedded within the asset 110, and the asset 110 may signal the movement detection by immediately increasing its blink transmission rate.

Figure 2:
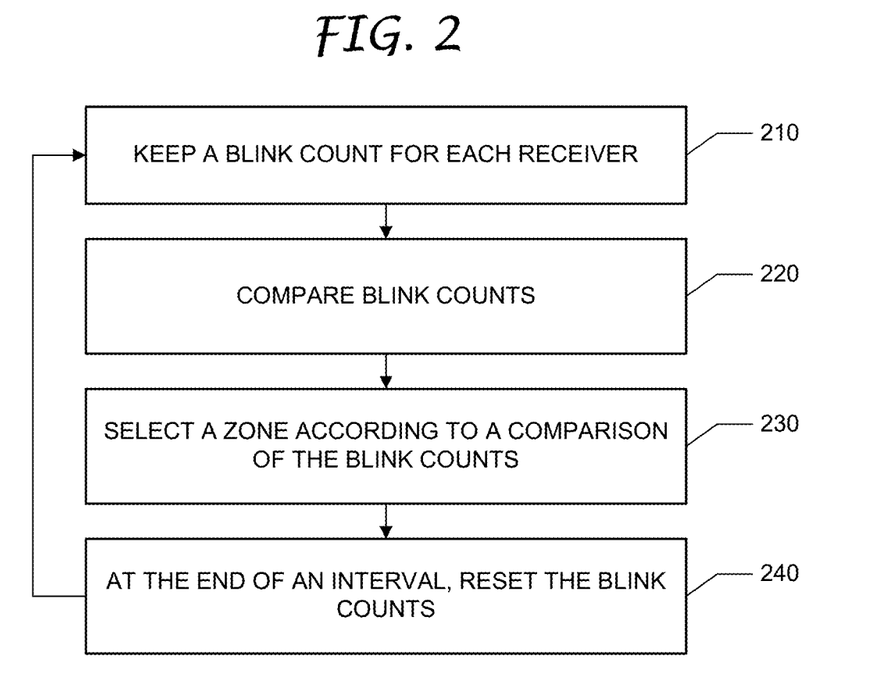
FIG. 2 is an illustration of a method of determining a location of a tagged asset among a plurality of receivers.

Reference is now made to FIG. 2, which illustrates a general method of locating the tagged asset 110 within the area 130. The area 130 comprises a plurality of spatial zones. Each receiver 120 is located in a zone of the area 130. At block 210, a blink count is kept for each receiver 120. Blink counts may be kept by the receivers 120, by a central processor, or by some other means. At block 220, blink counts are compared. At block 230, a zone is selected according to the comparison of the blink counts. For example, the zone corresponding to the receiver 120 having the highest blink count is selected. The tagged asset 110 is most likely to be located in the selected zone.

The functions are blocks 210 to 230 may be performed periodically. At block 240, at the end of an interval (e.g., five minutes), the blink count at each receiver 120 may be reset.

Such use of blink counts and multiple receivers enables the location of the tagged asset 110 to be determined without relying on measurements of receive signal strength indication, signal angle-of-arrival, or signal time difference of arrival. This, in turn, enables asset location and tracking by receivers that do not have the capability to perform measurements of RSSI, AoA, or TDOA. One such receiver is a Presence reader, which is designed to receive blink transmissions from active tag devices.

A method herein may be performed for a single tagged asset 110 or a plurality of tagged assets 110. If performed on a plurality of tagged assets 110, the signal emitted by each tagged asset 110 may include a unique identifier. The functions at blocks 210-230 may be performed independently on each tagged asset 110.

In some instances, where a large number of assets are being tracked, it might be desirable to reduce processing time. The following paragraphs describe an example of a system and method for tracking a large plurality of tagged assets within an area of interest.

Figure 3:
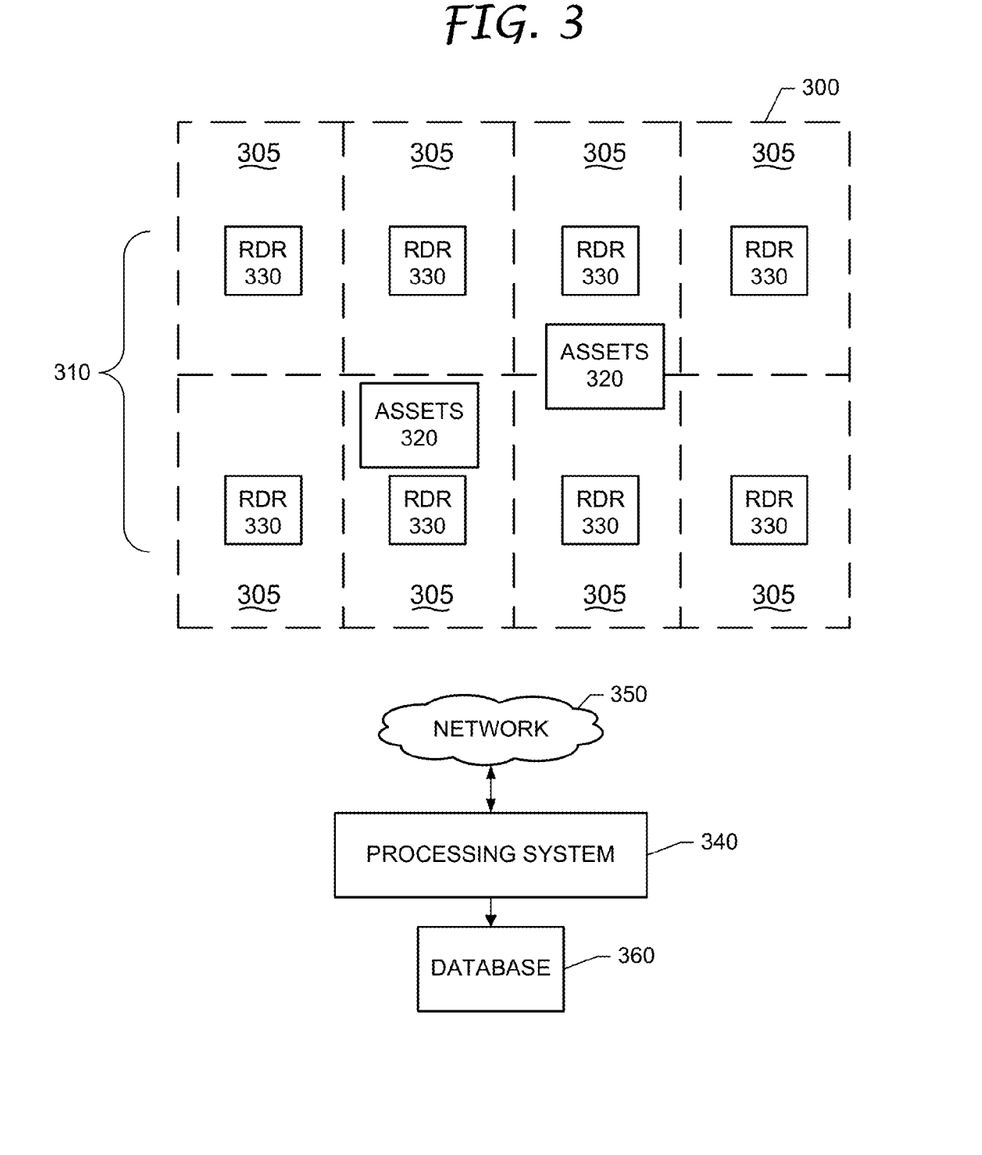
FIG. 3 is an illustration of a system for determining locations of a plurality of tagged assets.

Reference is now made to FIG. 3, which illustrates a system 310 for tracking a plurality of movable tagged assets 320 that are located in an area 300 of interest. The area 300 is partitioned into spatial zones 305. For instance, the area 300 may be partitioned into a grid of rectangular contiguous zones 305.

In this particular example, the assets 320 are tagged with active tags. An active tag may include a processor, machine-readable memory, transmitter or transceiver, antenna, and battery or other internal source of operating power. The antennas may be omnidirectional. Each active tag may transmit a radiowave or lightwave signal in periodic bursts (blink transmissions). Transmit range and transmit frequency may be fixed. Minimum information encoded in the blink transmissions includes a unique identifier for its associated asset 320. The blink transmissions may be encoded with additional information including, but not limited to, sensor data, switch contact on/off data, and Geo-Positioning Satellite (GPS) coordinate data.

The system 310 includes a plurality of Presence readers 330 located within the area 300. Each reader 330 may include a radiowave or lightwave signal collector element and receiver for receiving blink transmissions from any active tags within range. Range sensitivity may be adjustable. In some embodiments, each reader 330 may further include a processor and memory for processing each received blink transmission. The processing may include confirming the validity of each received blink transmission, reading the identifier in each blink transmission, and maintaining a receive blink count indication for each identifier that has been read over an interval. At the start of a new interval, the processor may reset the blink counts.

Figure 4A:
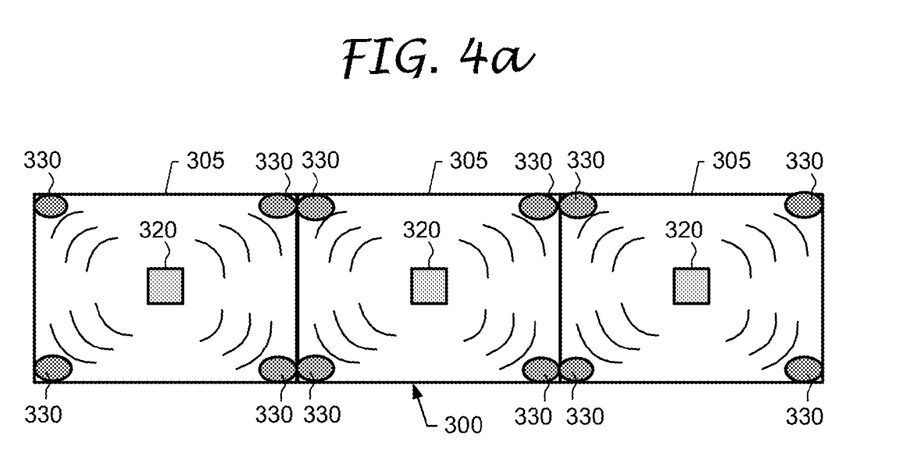
FIGS. 4a, 4b and 4c are illustrations of examples of reader distributions for the system of FIG. 3.
Figure 4B:
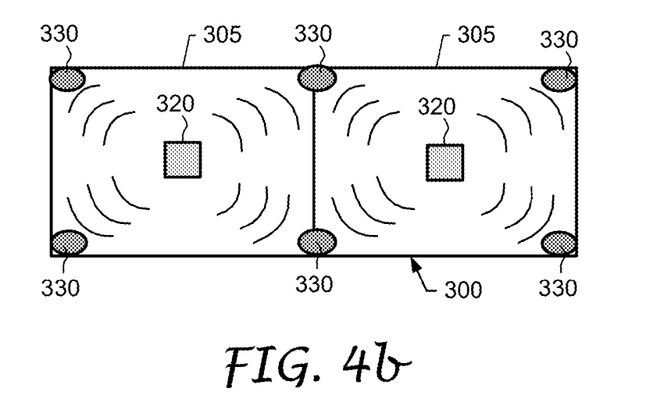
Figure 4C:
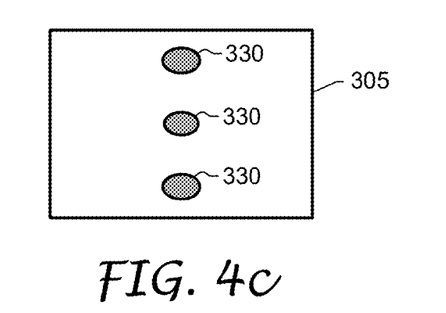

There may be one or more readers 330 in each zone 305. That is, each box labeled "RDR" may include one or more readers 330. Examples of three possible reader distributions are illustrated in FIGS. 4a, 4b and 4c. In FIG. 4a, readers 330 are located at the corners of each zone 305. In FIG. 4b, readers 330 are located at the far corners of the zones 305, and readers 330 are shared at the boundary of adjacent zones 305. In FIG. 4c, readers 330 are located at the middle of a zone 305. In all three examples, at least one reader 330 of a zone 305 is likely to receive transmissions from an asset 110 that moves into or within that zone 305.

Multiple readers 330 per zone 305 are advantageous in blocked line-of-sight, multipath, and high signal noise environments. Blocked line-of-sight and multipath environments refer to environments in which the area 300 is cluttered with many obstructions (including assets 320) that cause wireless signal transmissions between asset 320 and reader 330 to be blocked or bounce off obstructions. Resulting is a loss of blinks or blink signal strength prior to reaching readers 330. Line-of-site signal path probability from a tagged asset 320 to one or more readers 330, in turn, is increased. A high signal noise environment refers to an environment in which the area 300 is experiencing interference from in-band radiowave or lightwave signals. The interference may distort blink transmissions received at readers 330 to an extent that the blink transmissions cannot be detected or their validity cannot be confirmed and counted. By using multiple readers 330 per zone, and aggregating the receive blink count indications per zone 305, the effects of blocked signal paths, signal multipath, and interference from in-band noise is reduced.

The system 310 further includes processing system 340 that communicates with the readers 330. Communications may be wired, wireless, or a combination of the two. For example, the processing system 340 may communicate with the readers 330 via a network 350. The processing system 340 may be located at or near the area 300, or it may be at a remote location. Example of the processing system 340 include, without limitation, a desktop computer, mobile computer, and server. In some embodiments, the readers 330 and the processing system 340 may communicate over a wireless network such a wireless personal area network (WPAN), wireless local area network (WLAN), or mobile broadband network.

Figure 5A:
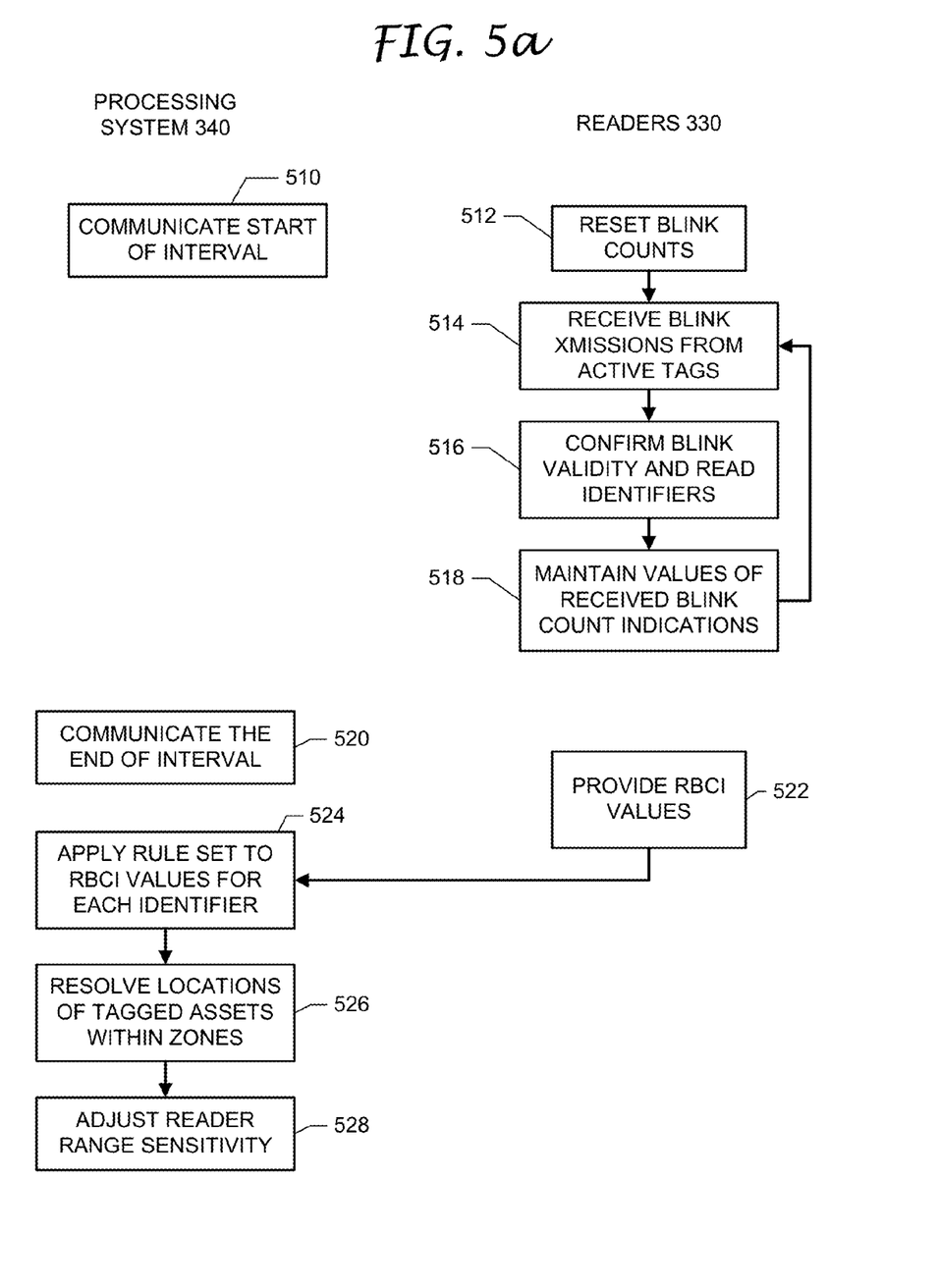
FIGS. 5a and 5b are illustrations of examples of methods of determining locations of a plurality of tagged assets among a plurality of readers.
Figure 5B:
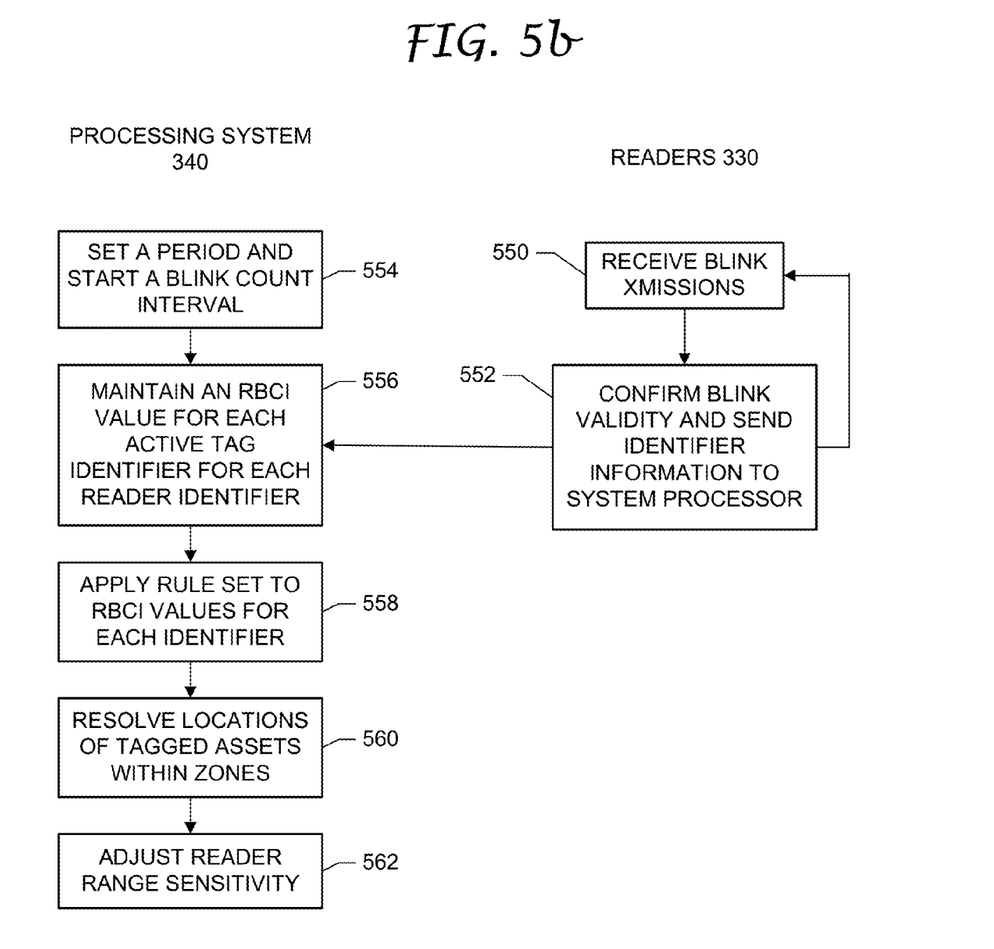

FIGS. 5a and 5b illustrate first and second methods of using the system 310 to locate a plurality of the tagged assets 320 within the area 300 of interest. In the first method, the readers 330 maintain the blink counts. In the second method, the processing system maintains the blink counts.

Reference is made to FIG. 5a, which illustrates the first method. At block 510, the processing system 340 communicates the start of an interval to the readers 330. In response, the readers 330 reset their blink counts (block 512).

During the interval, the readers 330 receive blink transmissions from active tags (block 514). Each reader 330 confirms validity of each blink transmission and reads an active tag identifier in each received blink transmission (block 516). Each reader 330 maintains a blink count for each identifier that has been read during the interval (block 518).

The functions at blocks 514-518 are repeated until the processing system 340 communicates that the interval has ended (block 520). In response, values of the received blink count indications are made accessible to the processing system 340 (block 522). For instance, the readers 330 are polled by the processing system 340, or each reader 330 sends a message including the RBCI values to the processing system 340. Each reader 330 automatically resets the blink counts, and maintains blink counts over a new interval, or waits for the processing system 340 to communicate the start of a new interval. Even though the blink counts are reset, the active tags continue generating blink transmissions.

The processing system 340 processes the RBCI values for each identifier (block 524). The processing may include determining the type of tagged asset associated with the unique identifier. For example, the computer system may look up the identifier in a database 360 (shown in FIG. 3). The database 360 may provide additional information about the tagged asset, such as a history of where the tool has been.

Figure 6:
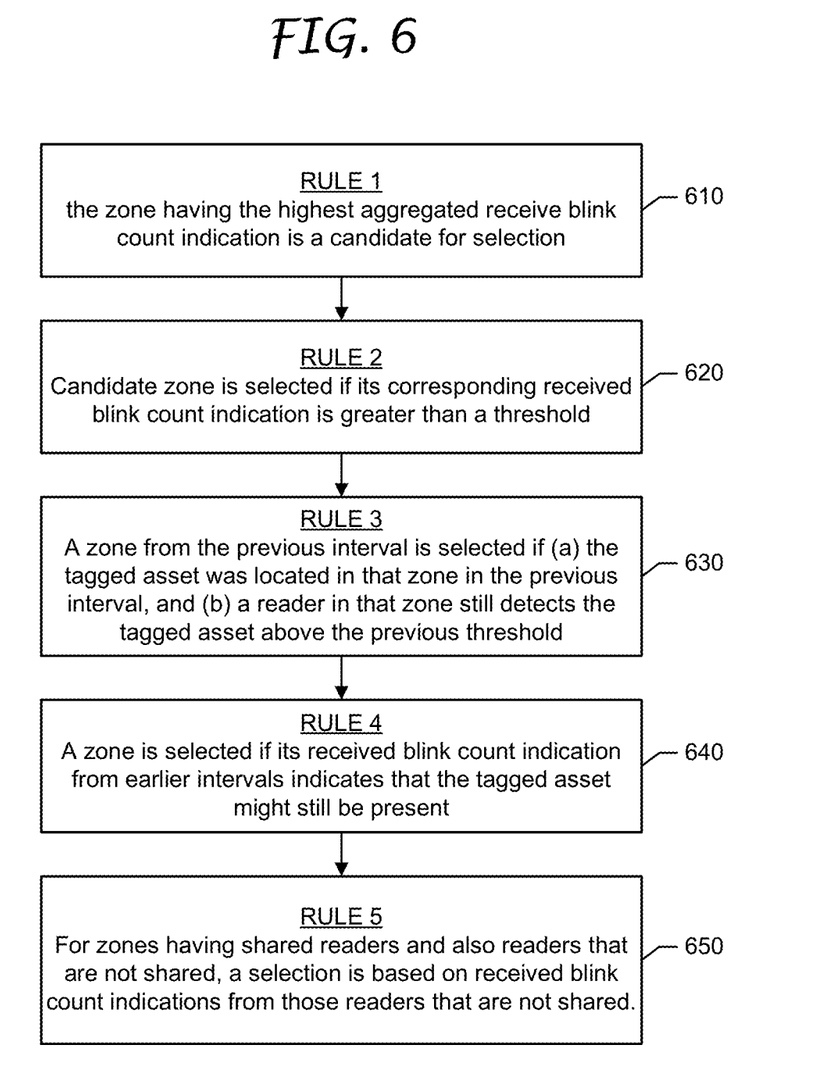
FIG. 6 is an illustration of a set of rules for determining the locations of the plurality of tagged assets.

The processing for each identifier also includes comparing the RBCI values corresponding to those of the different readers, and selecting the zone in which the corresponding tagged asset 320 is most likely located. The comparison may be performed quickly by applying a set of rules to the RBCI values. An example of a rule set is illustrated in FIG. 6 and described below.

At block 526, once a zone 305 has been selected, the location of the tagged asset 320 within the zone 305 may be resolved by comparing the relative counts of the readers 330 within the zone 305. A general method of resolving the location is described below in connection with FIG. 7.

At block 528, range sensitivity may be adjusted for one or more readers 330. The range sensitivity may be adjusted to fine tune to the area 300. Consider the example of a reader 330 that has too high a processing burden because it is receiving blink transmissions from too many tagged assets 320. The reader 330 can automatically reduce its range sensitivity. Consequently, the reader 330 will receive blink transmissions from fewer tagged assets 320 and thereby reduce its processing burden while, in turn, increasing line-of-site signal path probability between the fewer tagged assets 320 and the reader 330. Conversely, if a reader 330 is receiving too few blinks, it may automatically increase its range sensitivity.

The processing system 340 may then return functionality to block 510. Another interval is started, and received blink count indications are maintained (blocks 512-518) and processed (blocks 524-526).

Reference is now made to FIG. 5b, which illustrates the second method. At block 550, the readers 330 receive blinks from active tags within the area 300. The readers 330 do not maintain blink counts. At block 552, each reader 330 simply confirms the validity of each received blink transmission, and sends active tag and reader identifier information (e.g., active tag identifier, receiver identifier) to the processing system 340.

As the readers provide the identifier information, the processing system 340 processes the identifier information. At block 554, the processing system 340 sets a period and starts a blink count interval. At block 556, the processing system 340 maintains an RBCI value for each active tag identifier for each reader identifier. At block 558, at the end of the interval, the processing system 340 applies the rule set to the RBCI values. At block 560, once a zone 305 has been selected, the processing system 340 resolves the location of the tagged asset 320 within the zone 305 by comparing the relative counts of the readers 330 within the zone 305. At block 562, reader range sensitivity may be adjusted.

The system 310 is not limited to the real time adjustment of range sensitivity (blocks 528 and 562). The system 310 may also be designed with a "built-in" range sensitivity. For example, it might be desirable to receive signals from tagged assets 320 only from nearby zones 305 rather than the entire area 300. The system 310 may be designed with a range sensitivity that meets that desire.

As a first example, antenna style of the readers 330 has an impact on the range sensitivity. An omni-directional antenna has a wider (360 degree) coverage than a high gain antenna, but a shorter range sensitivity. An omni-directional or mid-gain antenna might be better suited for limiting the range sensitivity to adjacent zones 305.

As a second example, the type of network may have an impact on range sensitivity. An ultra wideband (UWB) network is a radio technology for transmitting information in pulses that are spread over a large radio frequency bandwidth (>500 MHz). The spreading limits the range of the pulses. A UWB network may be better suited for covering adjacent zones than, say, a WiFi network.

The system 310 may use the blink counts for more than determining the location of the tagged assets 320. For example, the rate of change in blink count may be used to detect movement of a tagged asset 320. An increase in rate might suggest that the tagged asset 320 is moving closer to a zone 305, whereas a reduction might suggest that the tagged asset 320 is moving away. In response to a rate change, the processing system 340 may reduce the interval to track the movement with higher resolution.

Reference is now made to FIG. 6, which illustrates an example of a set of rules for selecting a zone. Starting with Rule 1 (block 610), the zone having the highest aggregated receive blink count indication is a candidate for selection.

At Rule 2 (block 620), the candidate zone is selected if the aggregated RBCI of all of the readers in the candidate zone is greater than a threshold. This threshold, which may be established during system optimization, may vary from zone to zone, depending on where the readers 330 are installed within each zone combined with quantities and types of obstructions within each zone. For example, if more than 50% of all aggregated RBCIs come from the candidate zone, the candidate zone is selected. The threshold reflects the likelihood of the tagged asset being in that zone. The threshold enables a simple, quick test that reduces processing time and burden.

In some embodiments, the threshold may be determined from trial and error. In other embodiments, the threshold may be based on a probability distribution, which has a confidence interval that can be adjusted. As an example a 95% confidence interval around the mean has a ±0.025 error for reading a wrong tag location. If a 99% confidence is desired, then more readers 330 are added to increase the chance of locating the correct zone.

If Rule 2 is not satisfied, then the candidate zone is not selected, and at least one additional rule is applied to rule out wrong zones and to determine the zone in which the tagged asset is most likely located.

Rule 3 (block 630) looks back at the previous interval for information. A zone from the previous interval is selected if (a) the tagged asset was located in that zone in the previous interval, and (b) a reader in that zone still detects the tagged asset above the previous threshold.

Consider the following examples involving adjacent zones labeled zone 1, zone 2, and zone 3. (a) If presence of a tagged asset is confirmed by readers in zones 1 and 2 and its previous position was confirmed in zone 1, then zone 1 is selected. (b) If presence of a tagged asset is confirmed by readers in zones 1 and 2 and its previous position was confirmed in zone 2, then zone 2 is selected. (c) If presence of a tagged asset is confirmed by readers in zones 1, 2 and 3, and its previous position was confirmed in zone 1, then the tagged asset belongs to zone 1. (d) If presence of a tagged asset is confirmed by readers in zones 1, 2, and 3, and its previous position was confirmed in zone 3, then the tagged asset belongs to zone 3. (e) If presence of a tagged asset is confirmed by readers in zones 1, 2 and 3, and its previous position was confirmed in zone 2, then the tagged asset belongs to zone 2.

If the location in the previous interval was not conclusive, then Rule 4 is applied. Rule 4 looks back at the RBCIs of zones from two or more earlier intervals. A zone is selected if its RBCI from two or more earlier intervals indicates that the tagged asset might still be present. Consider the following examples. If presence of a tagged asset is confirmed by readers in zones 1, 2 and 3, and its previous location was confirmed in zones 2 and 3, then the prior position is determined. If that position was zone 2, then the tagged asset belongs to zone 2. If presence of a tagged asset is confirmed by readers in zones 1, 2 and 3, and its previous position was confirmed in zones 2 and 3, then the prior position is determined. If that position was zone 3, then the tagged asset belongs to zone 3.

An additional rule (block 650) may be implemented for a zone having multiple readers, at least one of which is shared with another zone. A selection is based on blink counts from those readers that are not shared Consider the reader distribution illustrated in FIG. 4b. For a tagged asset whose location is detected in zones 1 and 2, RBCIs are considered from those readers that are not shared. Zone 1 is selected if RBCIs of the non-shared readers in zone 1 confirm the location of the tagged asset in zone 1. Zone 2 is selected if RBCIs of the non-shared readers in zone 2 confirm the location of the tagged asset in zone 2.

This set of rules may be implemented in real time to facilitate a dynamic environment in which tagged assets move around. The RBCIs are refreshed over finite intervals to track movement from one zone to another. In this manner, the physical location of a tagged asset can be continuously tracked in accordance with the current RBCI and the previous history.

Figure 7:
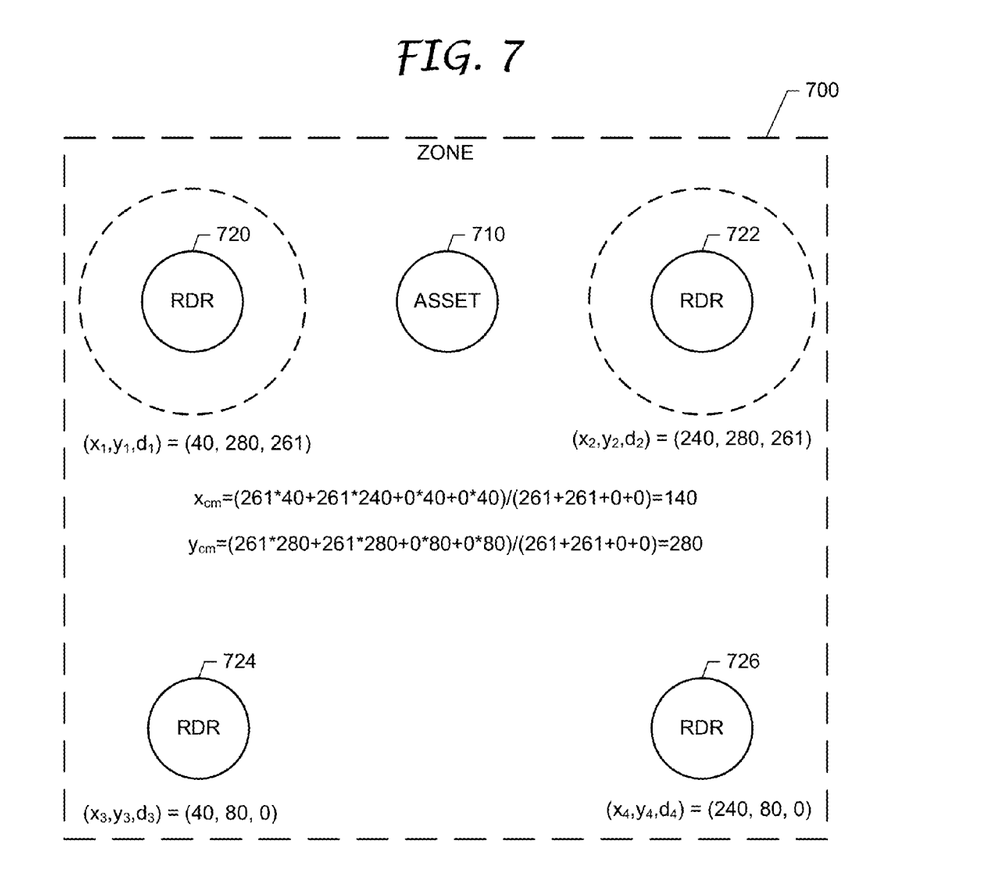
FIG. 7 is an illustration of a method of resolving the location of a tagged asset within a zone.

Reference is now made to FIG. 7, which illustrates a method of resolving the location of a tagged asset 710 within a zone 700. The location within the zone 700 may be resolved by a tri-lateration approach using received blink count indications for the set of readers 720-726 with known locations within that zone 700.

Empirically, a distance estimator $d_i$ from the tagged asset 710 to the $i^{th}$ reader may be proportional to the reader's received blink count indication. That is, $d_i \sim k*RBCI_i$, where k is a constant. The distance estimator is computed for each of the readers 720, 722, 724 and 726. Distance between a transmitter and receiver may instead be estimated by analysis of blink packet loss ratio (PLR). When blink packet transmission bit rate and packet size do not vary then the wireless channel PLR trends the same as the wireless channel bit error rate (BER). Consequently, a vector of wireless channel PLR as a function of range or distance mathematically derived from the wireless channel BER model may be created by the processing system. Alternatively, analysis of range or distance calibration measurements and associated PLR may also be conducted to derive a vector.

Let $(x_1,y_1), (x_2,y_2), \ldots, (x_N,y_N)$ denote the coordinates of the readers 720, 722, 724 and 726. Let $d_1, d_2, \ldots, d_N$ denote the estimated distances of the tagged asset 710 to the readers 720-726. A unique location in space is computed as a weighted average of the position of the system mass. This location, referred to as the center of mass, is used to compute the location of the tagged asset 710. The center of mass may be computed as:

$$X_{cm} = \frac{\sum_i d_i x_i}{\sum_i d_i}$$

x axis center of mass, or x location of the asset 710.

$$y_{cm} = \frac{\sum_i d_i y_i}{\sum_i d_i}$$

y axis center of mass, or y location of the asset 710.

Thus, the location of the tagged asset 710 within the zone 700 is $(x_{cm}, y_{cm})$. FIG. 7 provides some exemplary values for the location of the tagged asset 710 within the zone 700.

A method and system herein are not limited to any particular area of interest. The following paragraphs provide two examples of areas: an air field, and a warehouse floor.

The air field may be open or enclosed. The air field at an airport may be open. The air field within a delivery center or factory may be closed.

The zones of an air field may be aircraft stalls. For commercial aircraft, for instance, each stall may have an area on the order of 10,000 ft$^2$. At least four readers may be located per stall. Antennas of the readers may be designed to increase or decrease the circumference of the radio signal to narrow or wide radii.

The tagged assets may include service tools. Some of the service tools are associated with specific models of aircraft. The tagged assets may also include aircraft parts, and ground equipment (e.g., stairways, carts, lifts).

The system can locate tools and parts in a given stall at any given interval. By displaying the results, the system may help users locate their parts and tools. For instance, the system can tell a user where to pick up a particular tool.

The system may also be used to provide an understanding of asset utilization. For example, the system may provide a report indicating percentage utilization of an asset per stall. If the report indicates that a certain type of tool is moved frequently, more tools of that type might be needed.

The system may produce a daily inventory report indicating the locations of the tagged assets. The system may also produce an alert notification regarding asset locations.

In the second example, zones in a warehouse may be established by installing readers in defined areas to monitor asset movement into, from, and between areas. Tracking asset flow between zones may provide an indication of process flow efficiency and progress reports on asset flow movement.

The invention claimed is:
1. A method of locating a movable asset that is tagged with an active tag, the method comprising
    using a plurality of receivers spaced apart in two dimensions to simultaneously listen for a periodic signal from the active tag without interrogating the active tag;
    determining blink counts for those receivers that receive the periodic signal;
    using the blink counts as distance estimators between the active tag and each of the respective receivers based on the following:

$d_i \sim k*RBCI_i$ where $d_i$ is the distance estimator from the active tag to an $i^{th}$ receiver, k is a constant, and $RBCI_i$ is a received blink count indication for the $i^{th}$ receiver; and calculating the location of the active tag using the respective distance estimators of the active tag from each of those receivers that receive the periodic signal.

2. The method of claim 1, wherein the distance estimators are determined without relying on measurements of receive signal strength indication, signal angle-of-arrival, or signal time difference of arrival.

3. The method of claim 1, wherein the receivers include Presence readers.

4. The method of claim 3, wherein the Presence readers and the active tags operate on an ultra-wide bandwidth network.

5. The method of claim 1, further comprising adjusting receiver range sensitivity during blink count detection.

6. The method of claim 1, wherein different sets of the plurality of receivers cover different zones; wherein a zone is selected according to the blink counts; and wherein the tagged asset is located within the selected zone by computing the distance estimators from the active tag to the receivers in the selected zone, where each distance estimator is proportional to a received blink count indication at a corresponding receiver in the selected zone.

7. The method of claim 6, wherein the locating further includes computing a center of mass as a function of the distance estimators and coordinates of the receivers.

8. The method of claim 1, wherein multiple readers are located in a plurality of zones, wherein received blink count indications for each zone are aggregated, and wherein the aggregated indications are compared.

9. The method of claim 6, wherein selecting a zone includes applying a set of rules to the blink count indications.

10. The method of claim 9, wherein a zone having the highest received blink count indication is a candidate for selection.

11. The method of claim 10, wherein the candidate zone is selected if its corresponding aggregated indication is greater than a threshold.

12. The method of claim 11, wherein the threshold is based on a probability distribution of confidence of correctly locating the tagged asset.

13. The method of claim 11, wherein if the candidate zone is not selected, then at least one additional rule is applied to rule out wrong zones and to determine the zone in which the tagged asset is most likely located.

14. The method of claim 13, wherein a zone is selected if (a) its aggregated indication from the previous interval indicated the tagged asset was located in that zone in the previous interval, and (b) a receiver in that zone still detects the tagged asset above the previous threshold.

15. The method of claim 14, wherein a zone is selected if its received blink count indication from even earlier intervals indicates that the tagged asset might still be present in that zone.

16. The method of claim 6, wherein for zones having shared receivers and receivers that are not shared, a selection is based on blink counts from those receivers that are not shared.

17. The method of claim 6, wherein the zones correspond to an N×M grid of aircraft stalls, where N>1 and M>1, wherein the tagged assets include tools, and wherein multiple receivers are distributed in each stall.

18. A system for locating an active tag within one of a plurality of spatial zones, where each of the spatial zones includes a plurality of active tag readers having omnidirectional antennas, the system comprising a processor programmed to:

determine a received blink count indication for each of the readers, select the one zone using each blink count indication as a measure of length of signal path from a corresponding receiver to the active tag, computing a distance estimator between the active tag and each of the plurality of active tag readers in the one zone based on the received blink count indication for each of the plurality of active tag readers in the one zone, and determining an x location of the active tag and a y location of the active tag based on a weighted average of the distance estimators between the active tag and each of the plurality of active tag readers in the one zone.

19. A system for use with a plurality of spatial stalls arranged in an N×M grid, where N>1 and M>1, the system comprising:

a plurality of tagged assets located in at least one of the stalls, each asset tagged with an active tag, which periodically transmits a wireless signal including an identifier;

a plurality of sets of multiple readers, each set located within one of the stalls; and a processing system for determining locations of the assets with respect to the sets of multiple readers, including:

aggregating received blink count indications from each set of multiple readers for each one of the stalls, comparing the aggregated received blink count indications, and selecting one of the sets and, therefore, one of the stalls according to the comparison, computing distance estimators between each active tag and each of the readers in the selected set based on the received blink count indications for each of the readers in the selected set, and for each active tag, determining an x location and a y location based on a weighted average of the distance estimators between each active tag and each of the readers in the selected set.

20. The system of claim 19, wherein the assets are tagged tools and the item is a type of aircraft; and wherein the tagged tools are associated with specific models of aircraft.

21. The system of claim 20, wherein at least four readers are located per stall, and wherein each stall has an area on the order of 10,000 square feet.

22. The system of claim 21, further comprising a database, accessible by the processing system, for identifying tools according to identifiers in the wireless signals generated by the tagged assets.

* * * * *